Patented Aug. 16, 1949

2,479,275

UNITED STATES PATENT OFFICE 2,479,275

FUNGICIDAL COMPOSITION COMPRISING A PHENYL MERCURY SALT AND EXCESS LACTIC ACID

Frank J. Sowa, Cranford, N. J.

No Drawing. Application March 16, 1945, Serial No. 583,171

9 Claims. (Cl. 167—30)

This application is a continuation in part of my copending application Serial No. 443,304, filed May 16, 1942, now Patent No. 2,423,121.

This invention relates to germicides and fungicides adapted for use in treating textiles, paper, leather and the like and to compositions for use in agricultural sprays, seed disinfectants and elsewhere to inhibit the growth of fungi.

It is well known that aromatic mercury compounds such as phenyl mercury salts are excellent fungicidal agents. However, these compounds are relatively insoluble in water, and it is therefore difficult to apply these agents to textile fabrics in sufficient concentration to render them effective. On the other hand, many aromatic mercury salts are soluble to some extent in water, and therefore tend to leach out of fabrics treated therewith during washing or laundering of the fabrics. Similarly, when used in fungicidal sprays these agents cannot always be used in the desired concentration.

I have discovered that aqueous solutions which contain a molar excess of a hydroxy organic acid together with an aromatic mercury salt such as phenyl mercury salts render materials treated with such solutions lastingly resistant to the action of bacteria and fungi and may be produced as stable solutions containing a much higher concentration of the aromatic mercury salt than is possible in the absence of the excess hydroxy organic acid.

In general I prefer to employ those aromatic mercury salts which are most soluble in water, and with these salts I employ lactic acid or other water soluble hydroxy organic acids. When the aromatic mercury salt used is itself a salt of a hydroxy acid, relatively small amounts of additional hydroxy acid are necessary to obtain the desired concentration of the fungicidal agent in solution. On the other hand, when the aromatic mercury salt is phenyl mercury acetate or the like, a larger amount of the hydroxy acid is frequently required in order that double decomposition may take place and yet assure the presence of free hydroxy acid in the solution.

Such solutions when applied to fabrics result in a marked increase in the permanency of the inhibiting action of the germicidal agent. This is particularly true when the material treated is dried or subjected to heat.

One of the objects of the present invention is to provide novel water soluble compositions for use in inhibiting the growth of fungi.

Another object of the invention is to provide novel compositions adapted for use in the treatment of textiles to render them resistant to the action of bacteria and fungi.

A further object of the invention is to provide compositions and methods wherein a relatively high concentration of an organic mercury compound may be effected in an aqueous solution.

These and other objects and features of my invention will appear from the following description thereof in which specific examples are cited for the purpose of indicating the nature of my invention but without intending to limit the scope of the invention thereby.

Compositions embodying my invention containing aromatic mercury salt and sufficient hydroxy acid to insure the presence of free hydroxy acid in aqueous solution. The preferred aromatic mercury salts used are phenyl mercury compounds, and particularly good results are obtained when using phenyl mercury salts of hydroxy acids. Typical of the latter salts are phenyl mercury lactate, phenyl mercury tartrate, phenyl mercury salicylate and tolyl mercury salicylate. However, phenyl mercury acetate, phenyl mercury nitrate, phenyl mercury borate, phenyl mercury gluconate and other aromatic mercury salts may be used. It is also possible to use phenyl mercury hydroxide to advantage in the present invention. The hydroxy acid employed is preferably lactic acid, although other water soluble hydroxy acids may be used.

When using a salt such as phenyl mercury acetate or a compound such as phenyl mercury hydroxide in a solution containing substantial amounts of lactic acid it is presumed that phenyl mercury lactate is formed in solution and it is probable that this reaction product in combination with free lactic acid present gives rise to the characteristic solubility of the aromatic mercury compound and the increased permanency of the fungicidal properties imparted to textile fabrics treated with solutions containing such mixtures.

When aqueous solutions containing an aromatic mercury salt and a molar excess of lactic acid are heated there is some evidence that further reactions take place giving rise to insoluble compounds which may themselves be new.

This belief is supported by the fact that when phenyl mercuric acetate is dissolved in lactic acid and the solution heated to evaporate off one-fourth of its volume a heavy precipitate is formed which is substantially insoluble in water and does not melt even at 250° C. but has not been further identified. Similarly when a 10% solution of phenyl mercuric lactate in 80% lactic acid is heated to distill off one-fourth its volume, a viscid liquid of unknown composition is produced which is not readily soluble in water.

While it is believed that such reactions take place on treatment of cellulosic or other material in accordance with my invention, it should be understood that my invention is not limited by any theoretical consideration but is based upon my discovery of the new and remarkable properties of the solutions or mixtures herein described and the methods of producing and using the same.

The amount of the hydroxy acid used in any particular solution or mixture will vary considerably but should always be sufficient to insure the presence of a greater number of hydroxy acid ions than aromatic mercury ions in the solution. Such solutions are herein referred to as containing a molar excess of hydroxy acid. Thus from 1 to 20 moles of the hydroxy acid may be employed although I generally prefer to use about 2 to 5 moles of hydroxy acid for each mole of the mercury compound. When the mercury compound itself is a salt of a hydroxy acid I generally use only about ½ to 3 moles of additional hydroxy acid for each mole of hydroxy acid salts in the mixture.

The mixtures are preferably used in the form of aqueous solutions since they are more readily applied to materials in such form. The amount of the salts and acids in the solutions will of course be varied to produce the desired concentration or strength of the bactericidal and fungicidal agent in the finished product.

In order to illustrate my invention the following examples are cited but it should be understood that my invention is by no means limited thereto.

Example I 5 grams of phenyl mercuric lactate are dissolved in 100 cc. of 80% lactic acid and the resulting solution then diluted with 5000 cc. of water. The resulting diluted solution was padded onto cotton cloth to provide 100% increase in weight and the cloth was then dried by heating the cloth to a temperature of about 125° C. and finally washed with water.

The fabric thus treated was found to produce a halo of about 10 mm. when placed in a culture of *Staphylococcus aureus*. Furthermore, even after being leached continually in water for a period of 24 hours the fabric was found to produce a halo 6 mm. in diameter in a culture of a *Staphylococcus aureus*.

Example II 5 grams of phenyl mercury acetate was dissolved in 100 cc. of water containing two mole equivalents of lactic acid. This solution was diluted with 5000 cc. of water and applied to fabric in the same manner as in Example I.

The halo produced by this fabric was 11½ mm. in diameter before baking and after continuous leaching for twenty-four hours it still possessed sufficient inhibiting action to produce a halo 5½ mm. in diameter.

Example III 1000 g. of phenyl mercuric nitrate is dissolved in 3500 cc. of lactic acid and 10,000 cc. of water. 75 fluid ounces of the resulting solution is then added to 100 gallons of an aqueous solution containing 10% water-soluble dimethylol urea. A fabric is passed through this solution and is then dried. After the fabric is dried, it may be heated to temperatures sufficiently high to convert the dimethylol urea to an insoluble resin, for example, a temperature of 125° C. The conversion of the resin to the insoluble stage is promoted by the presence of the acid.

Whenever the heating of the treated textile to bring about the fixing of the germicide on the cellulose is considered undesirable or not feasible, the germicide may be rendered insoluble after application to the textile by converting the germicide from its water-soluble form to a water-insoluble organic mercury compound. This may be accomplished by passing the treated textile or article into an aqueous solution of a salt or acid which is capable of reaction with the soluble organic mercury compound to produce a water-insoluble organic mercury salt. For example, if the treated material is subjected to the action of soluble chlorides or hydrochloric acid, the organic mercury compound will be converted into organic mercury chloride which is water-insoluble. This embodiment of the invention may be further illustrated by the following specific example:

Example IV 100 grams of phenyl mercuric acetate is dissolved in 500 cc. of an 80% aqueous solution of lactic acid. The solution is heated to evaporate sufficient acetic acid and water to give a final volume of 440 cc. The resulting solution is then dissolved in 100 gallons of water. A viscose rayon fabric is treated with the solution thus produced so as to pick up 100% by weight of the solution, the fabric is then squeezed and passed into an aqueous solution containing 10% sodium chloride, whereupon the mercury compound is converted to the water-insoluble phenyl mercuric chloride, this compound being formed in situ within the fibres of the fabric. The fabric may then be squeezed, washed, if desired, and finally dried. The treated product will be found to be highly resistant to mildew and entirely washfast with respect to the germicide. If this process is applied to Osnaburg cloth, the treated cloth may be used for sand bags, ground covers and the like. The concentration of the aromatic mercury compound in the solutions used in treating fabric should generally be sufficient to cause the fabric to retain from about 0.1% to 2.0% of the germicidal agent based on the dry weight of the fabric.

When compositions embodying my invention are used as agricultural sprays, seed disinfectants, and for treatment of fruit trees, shade trees, lawns, turf or living vegetable matter to inhibit the growth of bacteria or fungi thereon, the solution may be sprayed directly on the living vegetable matter. The concentration of the aromatic mercury compound and lactic acid in the spray so used should be relatively low and insufficient to result in injury to the living vegetable matter treated. In general the amount of the aromatic mercury compound present in the spray should equal from about 0.01 to 0.20% by weight of the spray.

The solutions described in the foregoing examples may further be used in agricultural sprays, for use in the paper making industry and elsewhere to inhibit the growth of fungi and have many other commercial applications wherein it is desired to provide a relatively high concentration of an organic mercury compound in aqueous solution. In view thereof it should be understood that the composition and methods of using products embodying my invention and the concentration of the fungicidal agent in any particular solution may be varied considerably without departing from the spirit and scope of my invention as defined by the following claims.

What I claim is:

1. A composition for rendering materials resistant to the action of fungi comprising an aqueous solution containing a phenyl mercury compound and from ½ to 20 moles of lactic acid for each mole of the phenyl mercury compound in the solution.

2. A composition for rendering materials resistant to the action of fungi comprising an aqueous solution containing phenyl mercury lactate and from ½ to 3 moles of lactic acid for each mole of the phenyl mercury lactate in the solution.

3. A composition for rendering materials resistant to the action of fungi comprising an aqueous solution containing phenyl mercury acetate and from 1 to 20 moles of lactic acid for each mole of the phenyl mercury acetate in the solution.

4. A composition for rendering materials resistant to the action of fungi comprising an aqueous solution containing phenyl mercury acetate and from 2 to 5 moles of lactic acid for each mole of the phenyl mercury acetate in the solution.

5. A method of treating textiles to impart germicidal and fungicidal properties thereto which comprises wetting the textile with a solution of phenyl mercury lactate in an aqueous solution of lactic acid and drying the treated textile.

6. A method of rendering materials resistant to the action of fungi which comprises applying to the material an aqueous solution containing a phenyl mercury compound and free lactic acid and thereafter heating the treated material.

7. A method of rendering materials resistant to the action of fungi which comprises applying to the material an aqueous solution containing phenyl mercury lactate and free lactic acid and thereafter heating the treated material.

8. A method of rendering materials resistant to the action of fungi which comprises applying to the material an aqueous solution containing phenyl mercury acetate and free lactic acid and thereafter heating the treated material.

9. A method of rendering textiles resistant to the action of fungi which comprises applying to the textile an aqueous solution containing phenyl mercury lactate and lactic acid and thereafter heating the treated fabric to a temperature in the neighborhood of 125° C.

FRANK J. SOWA.

REFERENCES CITED

The following references are of record in the file of this patent:

UNITED STATES PATENTS

| Number | Name | Date |
| --- | --- | --- |
| Re. 21,197 | Hill et al. | Sept. 5, 1939 |
| 2,014,676 | Weed | Sept. 17, 1935 |
| 2,090,927 | Andersen | Aug. 24, 1937 |
| 2,099,888 | Hill et al. | Nov. 23, 1937 |
| 2,157,010 | Perkins | May 2, 1939 |
| 2,165,533 | Bradner | July 11, 1939 |
| 2,269,891 | Bowen et al. | Jan. 13, 1942 |